(12) United States Patent
Burger et al.

(10) Patent No.: US 8,055,881 B2
(45) Date of Patent: Nov. 8, 2011

(54) COMPUTING NODES FOR EXECUTING GROUPS OF INSTRUCTIONS

(75) Inventors: Douglas C. Burger, Austin, TX (US); Stephen W. Keckler, Austin, TX (US); Karthikevan Sankaralingam, Austin, TX (US); Ramadass Nagarajan, Austin, TX (US)

(73) Assignee: Board of Regents, University of Texas System, Austin, TX (US)

( * ) Notice: Subject to any disclaimer, the term of this patent is extended or adjusted under 35 U.S.C. 154(b) by 175 days.

(21) Appl. No.: 12/136,645

(22) Filed: Jun. 10, 2008

(65) Prior Publication Data

US 2008/0244230 A1   Oct. 2, 2008

Related U.S. Application Data

(60) Division of application No. 10/829,668, filed on Apr. 22, 2004, now abandoned, which is a continuation of application No. PCT/US02/34965, filed on Oct. 31, 2002.

(60) Provisional application No. 60/334,764, filed on Oct. 31, 2001.

(51) Int. Cl.
   *G06F 15/163*   (2006.01)
(52) U.S. Cl. ...................................................... 712/18
(58) Field of Classification Search .................. None
   See application file for complete search history.

(56) References Cited

U.S. PATENT DOCUMENTS 4,814,978 A   3/1989   Dennis ............................ 712/201
(Continued)

FOREIGN PATENT DOCUMENTS

EP   0410105 A2   1/1991
(Continued)

OTHER PUBLICATIONS

Requa et al. "The Piecewise Data Flow Architecture: Architectural Concepts". May 1983, pp. 425-437.*
(Continued)

*Primary Examiner* — Robert Fennema
(74) *Attorney, Agent, or Firm* — Schwabe, Williamson & Wyatt, P.C.

(57) ABSTRACT

A computation node according to various embodiments of the invention includes at least one input port capable of being coupled to at least one first other 5 computation node, a first store coupled to the input port(s) to store input data, a second store to receive and store instructions, an instruction wakeup unit to match the input data to the instructions, at least one execution unit to execute the instructions, using the input data to produce output data, and at least one output port capable of being coupled to at least one second other computation node. The node may also include a router to direct the output data from the output port(s) to the second other node. A system according to various embodiments of the invention includes and external instruction sequencer to fetch a group of instructions, and one or more interconnected, preselected computational nodes. An article according to an embodiment of the invention includes a medium having instructions which are capable of causing a machine to partition a program into a plurality of groups of instructions, assign one or more of the instruction groups to a plurality of interconnected preselected computation nodes, load the instruction groups on to the nodes, and execute the instruction groups as each instruction in each group receives all necessary associated operands for execution.

18 Claims, 3 Drawing Sheets

U.S. PATENT DOCUMENTS

| | | | | |
|---|---|---|---|---|
| 5,241,635 | A | 8/1993 | Papadopoulos et al. | 712/201 |
| 5,276,819 | A | 1/1994 | Rau et al. | 711/214 |
| 6,282,583 | B1 * | 8/2001 | Pincus et al. | 713/375 |
| 6,338,129 | B1 * | 1/2002 | Pechanek et al. | 712/11 |

FOREIGN PATENT DOCUMENTS

| | | |
|---|---|---|
| NL | 91/00598 | 11/1992 |
| WO | WO-01/97054 A2 | 12/2001 |

OTHER PUBLICATIONS

Fisher, Joseph. "Trace Scheduling: A Technique for Global Microcode Compaction". Jul. 1981. pp. 478-490.*

Joseph Fisher, "Trace Scheduling: A Technique for Global Microcode Compaction," IEEE Transaction on Computer, vol. C30, No. 7 (Jul. 1981).

Joseph Requa and James McGraw, "The Piecewise Data Flow Architecture: Architectural Concepts," IEEE Transactions on Computer, vol. C32, No. 5 (May 1983).

International Search Report mailed Dec. 29, 2003 in PCT/US02/34965.

Office Action mailed May 24, 2007 in U.S. Appl. No. 10/829,668.

Office Action mailed Oct. 30, 2007 in U.S. Appl. No. 10/829,668.

Office Action mailed Aug. 26, 2008 in U.S. Appl. No. 10/829,668.

Office Action mailed Mar. 24, 2009 in U.S. Appl. No. 10/829,668.

International Preliminary Report on Patentability mailed Feb. 9, 2004 in PCT/US02/34965.

Office Action mailed Oct. 13, 2009 in U.S. Appl. No. 10/829,668.

Office Action, issued in U.S. Appl. No. 10/829,668, mailed Mar. 9, 2010, 28 pages.

Office Action, issued in U.S. Appl. No. 10/829,668, mailed Jul. 23, 2010, 27 pages.

Patterson, D. A. et al., "Computer Architecture: A Quantitative Approach," 1990, pp. 146-161, Morgan Kaufmann Publishers, Inc., San Francisco, CA.

* cited by examiner

COMPUTING NODES FOR EXECUTING GROUPS OF INSTRUCTIONS

CROSS-REFERENCE TO RELATED APPLICATIONS

The present application is a divisional application of co-pending U.S. patent application Ser. No. 10/829,668, entitled "A Scalable Processing Architecture," filed Apr. 22, 2004, which is incorporated by reference herein. The present application claims priority benefits to U.S. patent application Ser. No. 10/829,668 under 35 U.S.C. §121. U.S. patent application Ser. No. 10/829,668 is a continuation under 35 U.S.C. 111(a) of PCT/US02/34965 filed on Oct. 31, 2002 and published in English on May 8, 2003 which claims priority under 35 U.S.C. 119 (e) of U.S. Provisional Application Ser. No. 60/334,764 filed on Oct. 31, 2001 which is incorporated herein by reference.

TECHNICAL FIELD

Embodiments of the invention relate to apparatus, systems, articles, and methods for data processing using distributed computational elements.

BACKGROUND OF THE INVENTION

The performance of conventional microarchitectures, measured in Instructions Per Cycle (IPC), has improved by approximately 50-60% per year. This growth has typically been achieved by increasing the number of transistors on a chip and/or increasing the instruction cycle clock speed. However, these results will not continue to scale with respect to future technologies (90 nanometers and below), because fundamental pipelining limits and wire delays bind such architectures to their data communications systems.

Instruction-Level Parallelism (ILP), which can describe methods of using multiple transistors, also refers to a process where multiple instructions are executed in parallel, and constitutes yet another path to greater computational performance. One approach to increasing the use of ILP is via conventional superscalar processor cores that detect parallelism at run-time. The amount of ILP that can be detected is limited by the issue window, the complexity of which grows as square of the number of entries. Conventional superscalar architectures also rely on frequently accessed global structures, slowing down the system clock or increasing the depth of the pipeline.

Another approach to the implementation of parallel processing is taken by VLIW machines, where ILP analysis is performed at compile time. Instruction scheduling is done by the compiler, orchestrating the flow of execution in a static manner. However, this approach works well only for statistically predictable codes, and suffers when dynamic events occur—a run-time stall in one function unit, or a cache miss, forces the entire machine to stall, since all functional units are synchronized. Thus, there is a need for new computational architectures that capitalize on the transistor miniaturization trend while overcoming communications bottlenecks.

SUMMARY OF THE INVENTION

The apparatus, systems, and methods described herein provide a simplified approach to increasing the amount of ILP that can be applied to programs, taking advantage of multiple, interconnected, and possibly identical computation nodes. The essence of the approach involves scheduling instructions statically for execution across specially preselected, interconnected nodes, and then issuing the instructions dynamically for execution.

A computation node according to various embodiments of the invention includes an input port capable of being coupled to at least one first other computation node, a first store to store input data, a second store to receive and store instructions, an instruction wakeup unit to match input data to instructions, at least one execution unit to execute the instructions and produce output data from the input data, and an output port capable of being coupled to at least one second other computation node. The node may also include a router to direct the output data from the output port to the second other node. A system according to various embodiments of the invention can include one or more interconnected, preselected computation nodes and an external instruction sequencer (coupled to the second store in the nodes) to fetch instruction groups.

An article according to an embodiment of the invention includes a medium having instructions capable of causing a machine to partition a program into a plurality of groups of instructions, assign one or more of the instruction groups to a plurality of interconnected, preselected computation nodes, load the instruction groups on to the nodes, and execute the instruction groups as each instruction in each group receives all necessary associated operands for execution.

This summary is intended to provide an exemplary overview of the subject matter further described hereinbelow. It is not intended to provide an exhaustive or exclusive explanation of various embodiments of the invention. The Detailed Description which follows is included to provide further information about such embodiments.

DETAILED DESCRIPTION

In the following detailed description of various embodiments of the invention, information with respect to making and using the various embodiments, including a best mode of practicing such embodiments, is provided. Thus, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to practice the teachings disclosed herein. Other embodiments may be utilized and derived therefrom, such that electrical, structural, and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

Herein a new architecture is disclosed that takes into consideration the technology constraints of wire delays and pipelining limits. Instructions are scheduled statically for execution on a computation substrate, and then issued dynamically.

The computation substrate can be configured as a two- (or more) dimensional grid of computation nodes communicatively coupled via an interconnection network. A compiler partitions the program into a sequence of blocks (e.g., basic blocks or hyperblocks), performs renaming of temporaries, and schedules instructions in a block to nodes in the grid. Instruction traces generated at run-time can also be used instead of (or in addition to) blocks generated by the compiler. In either case, blocks and/or traces are fetched one at a time and their instructions are assigned or mapped to the computation nodes en masse. Execution proceeds in a dataflow fashion, with each instruction sending its results directly to other instructions that use them. A set of interfaces are used by the computation substrate to access external data.

Figure 1:
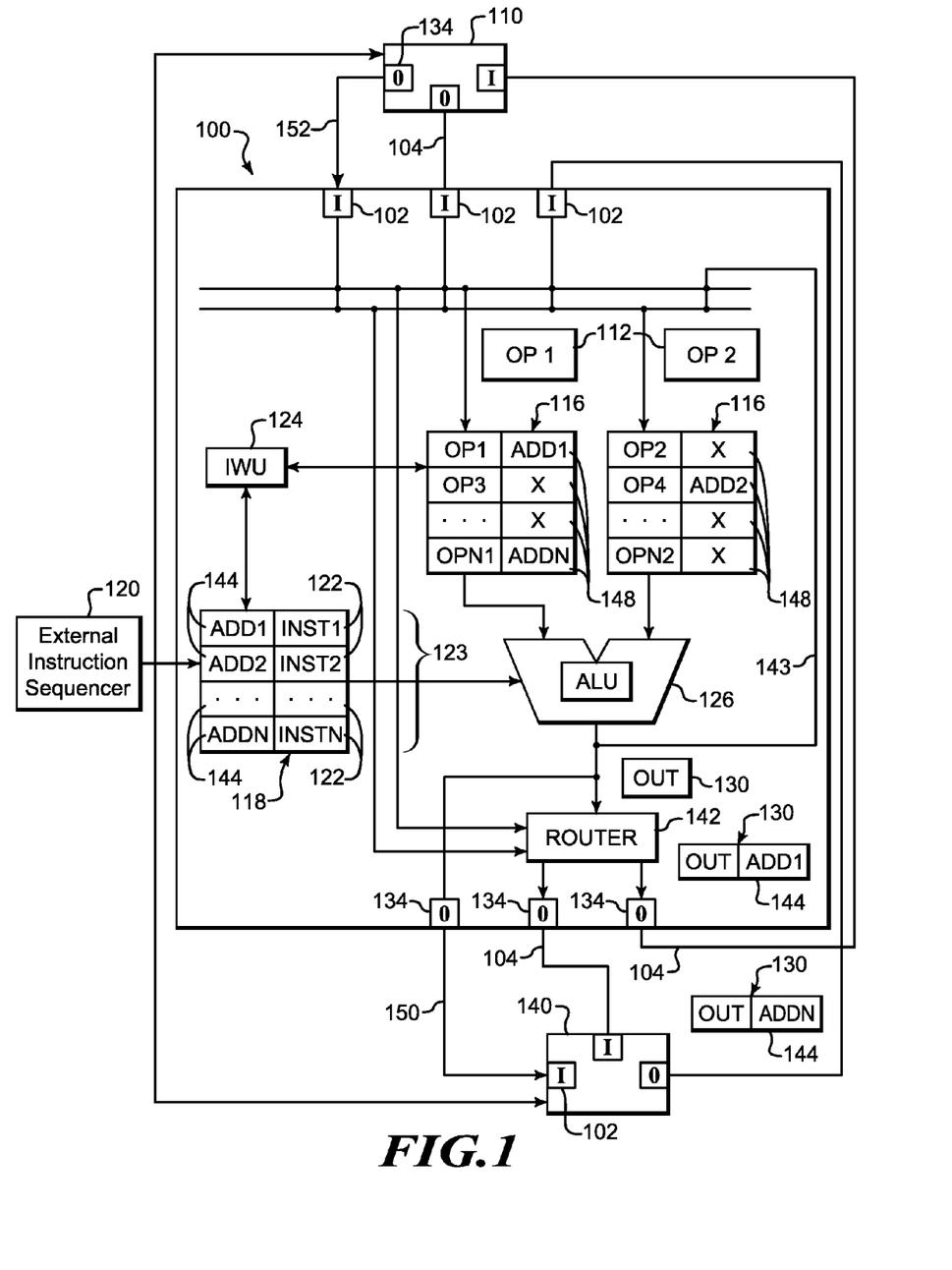
FIG. 1 is a schematic block diagram of an apparatus according to an embodiment of the invention.

FIG. 1 is a schematic block diagram of an apparatus according to an embodiment of the invention. The apparatus 100, such as a computation node 100 includes one or more input ports 102 capable of being communicatively coupled (in some embodiments by using transport channels 104) to at least one substantially simultaneously preselected computation node 110. The input ports 102 receive input data 112, such as operands OP1, OP2, OP3, OP4, ..., OPn1, ..., OPn2 112.

As used herein, the term "substantially simultaneously preselected" means, with respect to a computation node 100 (i.e., an executing node), that the mapping of an instruction to the executing node was determined prior to fetching the instruction, and at about the same time as the nodes (i.e., one or more producer nodes) providing the input data to be used or consumed by the mapped instruction at the executing node, as well as the nodes (i.e., one or more consumer nodes) consuming any output data provided by the executing node as a result of executing the mapped instruction, were also determined. Further, as used herein, a "group of instructions" means some selected number of instructions, contiguous in program order, assigned as a group to a plurality of nodes prior to any single instruction in the group being fetched. It should be noted that individual instructions included in a selected group of instruction are typically, although not always, mapped to a corresponding number of specific nodes in order to minimize the physical distance traveled by operands included in a critical path associated with the group. Mapping can also, or in addition, be accomplished so as to minimize the execution associated with a particular group of instructions.

The node 100 includes a first store 116, which may have one or more memory locations, coupled to the input port(s) 102 to store the input data 112. Thus the first store 116 can be used to retain one or more operands or elements of input data 112. In addition, the node 100 can include a second store 118, also comprising one or more memory locations, coupled to an external instruction sequencer 120. The second store 118 receives and stores one or more instructions INST1, INST2, ..., INSTn 122 from the external instruction sequencer 120. As used here, the term "external" means, with respect to the instruction sequencer 120, that the sequencer 120 is not located within any of the computation nodes 100, 110, 140 to which it can pass instructions 122. One or more instructions 122 can be included in an instruction group 123.

The node 100 also includes an instruction wakeup unit 124 to match the input data 112 to the instruction 122, and at least one execution unit 126 to execute the instructions 122 passed to the execution unit 126 by the wakeup unit 124 using the input data 112 and the instructions 122 to produce output data 130. The execution unit 126 can include one or more arithmetic logic units, floating point units, memory address units, branch units, or any combination of these units.

One or more output ports 134 included in the node 100 can be coupled to at least one substantially simultaneously preselected computation node 140 (in some embodiments, by using transport channels 104). It should be noted that the substantially simultaneously preselected nodes 110, 140 can be similar to or identical to node 100. The node 100 can also include a router 142 to send or direct the output data 130 from the output ports 134 to one or more substantially simultaneously preselected computation nodes 140.

The instructions 122 can include a destination address 144 associated with the substantially simultaneously preselected computation node 140. The router 142 is capable of using the destination address ADD1 144, for example, to direct the output data 130 to the node 140. Destination addresses 144 can be generated by, among other mechanisms, a compiler and a run-time trace mapper. In some embodiments, the output data 130 can include the destination address ADD1 144 associated with the computation node 140. However, the router 142 is capable of using the destination address ADD1 144 to direct the output data 130 to the computation node 140, whether the address ADD1 144 is included in the output data 130, or merely associated with the output data 130.

Similarly, the input data OP1 112 can include, or be associated with, a destination address ADD1 148 associated with the computation node 140, such that the router 142 is capable of using the destination address ADD1 148 to send or direct the input data OP1 112 directly to the computation node 140. This may occur, for example, if the input data OP1 112 is ultimately destined for use within the node 140 (i.e., the consuming node 140), but must pass through the node 100 as part of the shortest path from the node 110 that produces or provides it (i.e., the producing or provider node 110). The node 100 is also capable of routing output data 130 back to itself along the bypass path 143, such that an instruction INSTn 122 can include a destination address ADDn 144 associated with the node 100. The router 142 is then also capable of using the destination address ADDn 144 to direct the output data 130 back to the node 100 for use with another instruction INSTn 122.

To further enhance the capabilities of the node 100, one or more of the output ports 134 can be communicatively coupled to a direct channel 150, which, unlike transport channels 104, bypasses the router 142 and makes a direct connection between the execution unit 126 and the node 140. Thus, one or more of the input ports 102 of the node 140 can be communicatively coupled to the direct channel 150. Similarly, one or more of the input ports 102 of the node 100 can be communicatively coupled to a direct channel 152 which bypasses the router (not shown) included in the node 110 to makes a direct connection between the execution unit 126 (not shown) in the node 110 and the node 100.

Figure 2:
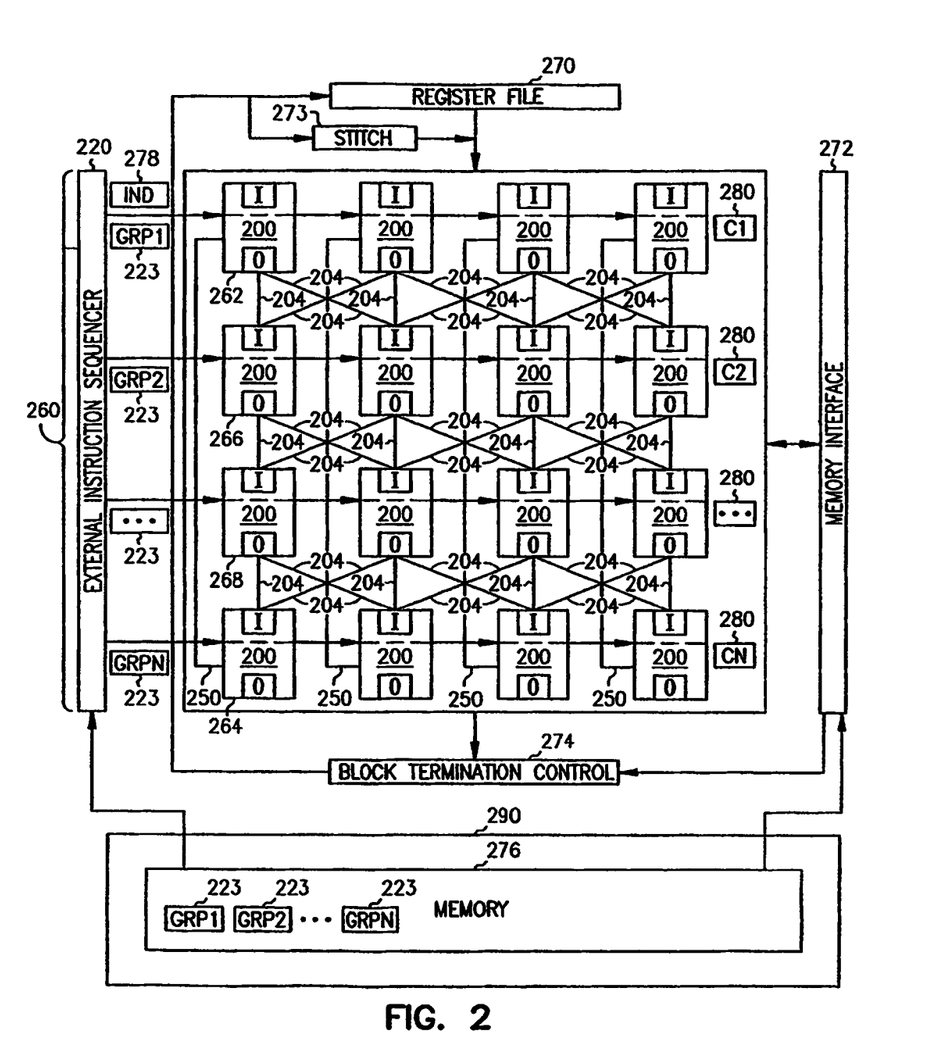
FIG. 2 is a schematic block diagram of a system according to an embodiment of the invention.

FIG. 2 is a schematic block diagram of a system according to an embodiment of the invention. Here a system 260, such as a processor 260 is shown to include an external instruction sequencer 220, similar to or identical to the external instruction sequencer 120 (shown in FIG. 1) as well as one or more nodes 200, similar to or identical to nodes 100, 110, and/or 140 (also shown in FIG. 1), included on a computation substrate 261. The external instruction sequencer 220 is used to fetch one or more groups of instructions, such as the instruction groups GRP1, GRP2, ..., GRPn 223. A single group of instructions may include one or more instructions, such as the instructions INST1, INST2, ..., INSTn 122 shown in FIG. 1.

As seen in FIG. 2, the nodes 200 can be connected in just about any topology desired. For example, each node 200 can be connected to each and every other node 200 included in the system 260. One or more nodes 200 can also be connected to just one other node 200, or to some selected number of nodes 200, up to and including all of the nodes 200 included in the system 260.

Connections between the nodes 200 can be effected via routers (not shown) included in the nodes 200, and transport channels 204, which are similar to or identical to transport channels 104 shown in FIG. 1, and/or direct channels 250, which are similar to or identical to the direct channels 150, 152 shown in FIG. 1. As noted previously, the direct channels 250 include communication connections between selected nodes 200 that bypass routers (not shown) in the nodes 200, so that input data and output data can be sent directly from one node 200 to another node 200 (e.g., from node 262 to node 264) without travelling through a router or other nodes 200. In most embodiments, however, the input ports of each node 200 are connected to the output ports of at least one other preselected node 200, such as a substantially simultaneously preselected node 200. Similarly, the output ports of each node 200 are connected to the input ports of at least one other preselected node 200, such as a substantially simultaneously preselected node 200. For example, as shown in FIG. 2, the input ports of node 266 (among other nodes) are connected to the output ports of substantially simultaneously preselected node 262, and the output ports of node 266 (among other nodes) are connected to the input ports of substantially simultaneously preselected node 268. In turn, the output ports of node 268 (among other nodes) are connected to the input ports of substantially simultaneously preselected node 264. Almost any coupling topology desired can be addressed by using the transport channels 204 and the direct channels 250 to connect the nodes 200.

The system 260 can also include a register file 270, a memory interface 272, stitch logic 273, and a block termination control 274, each communicatively coupled to the nodes 200. In addition, the system 260 can include one or more memories 276 coupled to the external instruction sequencer 220, as well as to the memory interface 272. The memory 276 can be volatile or nonvolatile, or a combination of these types, and may include various types of storage devices, such as Random Access Memory (RAM), Read Only Memory (ROM), FLASH memory, disk storage, and any other type of storage device or medium. The memory 276 can comprise an instruction memory used to store one or more selected groups of instructions, such as the group of instructions GRP1 223.

The register file 270 operates to receive indications 278 to send operands or input data to be used by instructions within the nodes 200, and/or to receive data upon completion of an instruction group, and/or to store values produced in a group of instructions that are live outside of the group in which the value is produced. The register file 270 can be coupled to the block termination control 274, which operates to detect execution termination of a selected group of instructions, such as the group of instructions GRP1 223. The performance of the system 260 may be further enhanced by including an instruction cache C1, C2, . . . , Cm 280 for each one of the m rows of nodes 200. It should be noted that, when all of the consumers of a particular datum reside within the group of instructions that produce that datum, it is not necessary to write the datum to a register file.

The stitch logic module 273 is used to accomplish "register-stitching". This can occur when, for example, executing a first group of instructions produces output data (typically written to a register), and a second concurrently executing group of instructions can use the output data so produced as input data. In this case, the output data can be forward directly from the first group to the second group via the stitch logic module 273.

The nodes 100, 110, 140, 200, 262, 264, 266, 268; input ports 102; first store 116; second store 118; external instruction sequencer 120; instruction wakeup unit 124; execution unit 126; output ports 134; router 142; direct channels 150, 152, 250; system 260; register file 270; memory interface 272; stitch logic module 273; block termination control 274; memory 276; and instruction caches 280 may all be characterized as "modules" herein. Such modules may include hardware circuitry, and/or one or more processors and/or memory circuits, software program modules, and/or firmware, and combinations thereof, as desired by the architect of the nodes 100, 200 and the system 260, and as appropriate for particular implementations of various embodiments of the invention.

One of ordinary skill in the art will understand that the apparatus and systems of the present invention can be used in applications other than for parallel instruction processing, and thus, embodiments of the invention are not to be so limited. The illustrations of nodes 100, 200, and a system 260 are intended to provide a general understanding of the structure of various embodiments of the present invention, and are not intended to serve as a complete description of all the elements and features of apparatus and systems that might make use of the structures described herein.

Applications that may include the novel apparatus and systems of the present invention include electronic circuitry used in communication and signal processing circuitry, modems, processor modules, embedded processors, and application-specific modules, including multilayer, multichip modules. Such apparatus and systems may further be utilized as sub-components within a variety of electronic systems, including cellular telephones, personal computers, dedicated data acquisition systems, and others.

Figure 3:
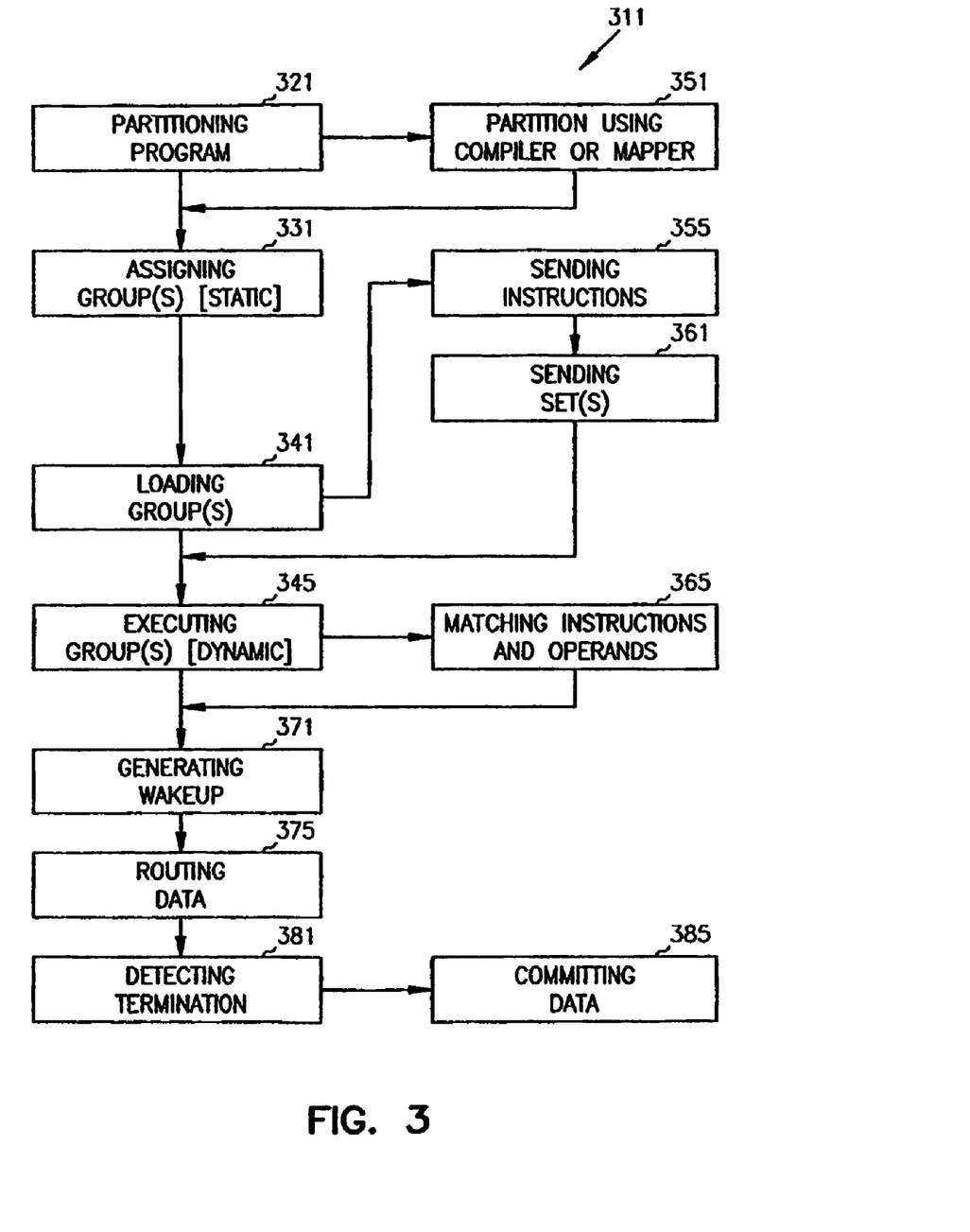
FIG. 3 is a flow diagram illustrating a method according to an embodiment of the invention.

FIG. 3 is a flow diagram illustrating a method according to an embodiment of the invention. The method 311 may begin with partitioning a program into a plurality of groups of instructions at block 321, and continue with assigning one or more groups of instructions selected from the plurality of groups of instructions to a plurality of interconnected preselected computation nodes, such as the nodes 100, 200 shown in FIGS. 1 and 2, respectively, at block 331. The nodes 100, 200 in the group of interconnected preselected nodes can be connected in any topology desired, as noted above.

One or more of the groups in the plurality of instruction groups can be a basic block, a hyperblock, or a superblock. Alternatively, or in addition, one or more of the groups in the plurality of instruction groups can be an instruction trace constructed by a hardware trace construction unit at run time.

At block 341, the method 311 may continue with loading the assigned group(s) of instructions on to the plurality of interconnected preselected computation nodes, and executing the group(s) of instructions at block 345 as each one of the instructions in a respective group of instructions receives all necessary associated operands for execution.

Partitioning the program into groups of instructions can be performed by a compiler at block 351. Partitioning the program into groups of instructions can also be performed by a run-time trace mapper, or a combination of a compiler and a run-time trace mapper, at block 351.

Loading the assigned group(s) of instructions on to the plurality of interconnected preselected computation nodes at block 341 can include sending at least two instructions selected from the group of instructions from an instruction sequencer to a selected computation node included in the plurality of interconnected preselected computation nodes for storage in a store at block 355. In any case, one or more of the plurality of groups (including all of the groups) can be statically assigned for execution.

Alternatively, or in addition, loading the assigned group(s) of instructions on to the plurality of interconnected preselected computation nodes at block 341 can include sending multiple sets of instructions at block 361, such as sending a first set of instructions selected from a first group of instructions (selected from a plurality of groups of instructions) from an instruction sequencer to the plurality of interconnected preselected computation nodes for storage in a first frame (included in a first computation node), and sending a second set of instructions selected from the first group of instructions from the instruction sequencer to the plurality of interconnected preselected computation nodes for storage in a second frame (included in the first computation node).

As used herein, the term "frame" means a designated set of buffers spanning a plurality of nodes 100, wherein one buffer (e.g. selected from the stores 116, 118) of a particular frame is typically (but not always) included in each node 100 in the plurality of nodes 100. Thus, each frame may permit mapping the same number of instructions as there are nodes 100. Each group of instructions can span multiple frames, and multiple groups of instructions can be mapped on to multiple frames. For example, the number of frames may be selected so as to be equal to the number of instruction storage locations in the store 116 and/or store 118. However, the embodiments of the invention are not so limited.

Assigning one or more groups of instructions to a plurality of interconnected preselected computation nodes at block 331 can also include assigning a first group of instructions to a first set of frames included in the plurality of interconnected preselected computation nodes, assigning a second group of instructions to a second set of frames included in the plurality of interconnected preselected computation nodes (wherein the first group and the second group of instructions are capable of concurrent execution), and wherein at least one output datum associated with the first group of instructions is written to a register file and passed directly to the second group of instructions for use as an input datum by the second group of instructions.

Other assignments can be made, including assignments for other sets of instructions. For example, once assignments for a third and fourth set of instructions have been made, and continuing the previous example, loading the assigned group(s) of instructions on to the plurality of interconnected preselected computation nodes at block 341 can include sending a third set of instructions selected from a second group of instructions (selected from the plurality of instruction groups) from an instruction sequencer to the plurality of interconnected preselected computation nodes for storage in the first frame, and sending a fourth set of instructions selected from the second group of instructions from an instruction sequencer to the plurality of interconnected preselected computation nodes for storage in the second frame.

Executing the group of instructions as each one of the instructions in the group of instructions receives all necessary associated operands for execution at block 345 can include matching at least one instruction selected from the group of instructions with at least one operand received from another computation node included in the plurality of interconnected preselected computation nodes at block 365. In any case, one or more of the instructions included in at least one of the plurality of instruction groups (including an entire group or all of the instruction groups) can be dynamically issued for execution.

The method may continue with generating one or more wakeup tokens to reserve one or more output data channels (e.g., transport channels or direct channels) to connect selected computation nodes included in the plurality of interconnected preselected computation nodes at block 371. Generating wakeup tokens may operate to accelerate the wakeup of one or more corresponding consuming instructions (i.e., instructions which receive the data).

The method 311 may continue, at block 375, with routing one or more output data arising from executing the group of instructions to one or more consumer nodes (e.g., nodes coupled to the output ports of the producing or provider node(s)) included in the plurality of interconnected preselected computation nodes, wherein the addresses of the consumer nodes are included in a token associated with at least one instruction included in the group of instructions. The method 311 may also include detecting execution termination of one or more groups of instructions at block 381. If one or more of the instructions includes an output having architecturally visible data, the method 311 may conclude with committing the architecturally visible data to a register file and/or memory at block 385. It should be noted that multiple groups of instructions can execute concurrently, and that data from each group is typically (although embodiments of the invention are not so limited) committed to register files and/or memory in serial fashion with the data from a previously-terminating group being committed prior to data from a later-terminating group.

Referring to the methods just described, it should be clear that some embodiments of the present invention may also be realized in the context of computer-executable instructions, such as program modules, being executed by a computer. Generally, program modules may include routines, programs, objects, components, data structures, etc. that perform particular tasks or implement particular abstract data types. As such, any of the modules 100, 102, 110, 116, 118, 120, 124, 126, 134, 140, 142, 150, 152, 200, 250, 260, 262, 264, 266, 268, 270, 272, 274, 276, and 280 described herein may include software operative on one or more processors to perform methods according to the teachings of various embodiments of the present invention.

One of ordinary skill in the art will understand, upon reading and comprehending this disclosure, the manner in which a software program can be launched from a computer readable medium in a computer-based system to execute the functions defined in the software program. One of ordinary skill in the art will further understand the various programming languages that may be employed to create one or more software programs designed to implement and perform the methods disclosed herein. The programs can be structured in an object-orientated format using an object-oriented language such as Java, Smalltalk, or C++. Alternatively, the programs can be structured in a procedure-orientated format using a procedural language, such as COBOL or C. The software components may communicate using any of a number of mechanisms that are well-known to those skilled in the art, such as application program interfaces (API) or interprocess communication techniques such as the Remote Procedure Call (RPC). However, the teachings of various embodiments of the present invention are not limited to any particular programming language or environment.

As is evident from the preceding description, and referring back to FIGS. 1 and 2, it can be seen that during the operation of the nodes 100, 200 (as well as the system 260), a processor or control logic 220 may access some form of computer-readable media, such as memory 276. Thus, a system 260 having nodes 200 according to an embodiment of the invention may also include a processor 220 coupled to a memory 274, volatile or nonvolatile.

By way of example and not limitation, computer-readable media may comprise computer storage media and communications media. Computer storage media includes volatile and non-volatile, removable and non-removable media implemented in any method or technology for storage of information such as computer-readable instructions, data structures, program modules or other data. Communications media specifically embodies computer-readable instructions, data structures, program modules or other data in a modulated data signal such as a carrier wave, coded information signal, and/or other transport mechanism, which includes any information delivery media. The term "modulated data signal" means a signal that has one or more of its characteristics set or changed in such a manner as to encode information in the signal. By way of example and not limitation, communications media also includes wired media such as a wired network or direct-wired connections, and wireless media such as acoustic, optical, radio frequency, infrared and other wireless media. Combinations of any of the above are also included within the scope of computer-readable and/or accessible media.

Thus, it is now easily understood that another embodiment of the invention may include an article 290 comprising a machine-accessible medium or memory 276 having associated data, wherein the data, when accessed, results in a machine performing activities such as partitioning a program into a plurality of groups of instructions, assigning a group of instructions selected from the plurality of groups of instructions to a plurality of interconnected preselected computation nodes, loading the group of instructions to the plurality of interconnected preselected computation nodes, and executing the group of instructions as each one of the instructions in the group of instructions receives all necessary associated operands for execution.

As noted above, other activities may include partitioning the program into the plurality of groups of instructions, as performed by a compiler or a run-time trace mapper; statically assigning all of the plurality of groups of instructions for execution; and dynamically issuing one or more instructions selected from one or more of the plurality of groups of instructions for execution. Still further activities can include generating a wakeup token to reserve an output data channel to connect selected computation nodes included in the plurality of interconnected preselected computation nodes; routing one or more output data arising from executing the group of instructions to one or more consumer nodes included in the plurality of interconnected preselected computation nodes, wherein the address of each one of the consumer nodes is included in a token associated with at least one instruction included in the group of instructions; detecting execution termination of a group of instructions (including an output having architecturally visible data); and committing the architecturally visible data to a register file and/or a memory.

Although specific embodiments have been illustrated and described herein, those of ordinary skill in the art will appreciate that any arrangement which is calculated to achieve the same purpose may be substituted for the specific embodiments shown. This disclosure is intended to cover any and all adaptations or variations of various embodiments of the present invention. It is to be understood that the above Detailed Description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. It should also be noted that in the foregoing Detailed Description, various features may be grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. A first computation node, comprising:
   an input port configured to be coupled to a first direct channel to directly couple the first computation node to a second computation node of a plurality of computation nodes, to enable the input port to directly receive input data from the second computation node, wherein the plurality of computation nodes are directly interconnected using direct channels, and preselected to execute a subset of a group of instructions partitioned from a program, and the plurality of preselected computation nodes include at least the first and second computation nodes;
   a first store configured to receive an instruction from an external source, and store the instruction, wherein the first store together with at least a second store of a third of the computation nodes form a frame of buffers spanning the plurality of computation nodes to store the subset of instructions prior to availability of operands of the subset of instructions;
   at least one execution unit configured to execute the instruction using the input data to produce output data;
   a first output port and a second output port configured to be respectively coupled to a second direct channel and a third direct channel to directly couple the first computation node to respective ones of the second computation node and the third computation node, to enable the output data to be selectively, but directly, provided to either the second computation node or the third computation node, via a corresponding one of the second or third direct channel, for execution of another one of the subset of instructions; and
   a router coupled with the at least one execution unit to route the output data to either a third output port or a fourth output port, for alternative selective provision to either the second computation node or the third computation node, via a transport channel, wherein the plurality of computation nodes are further interconnected via the transport channel.

2. The first computation node of claim 1, wherein the instruction includes a destination address associated with the third computation node, and wherein the router is configured to use the destination address, when the router is employed, to route the output data to the fourth output port for provision to the third computation node, via the transport channel.

3. The first computation node of claim 2, wherein the destination address is generated by a mechanism selected from the group consisting of: a compiler and a run-time trace mapper.

4. The first computation node of claim 1, wherein the instruction includes a destination address associated with the second computation node, and wherein the router is configured to use the destination address, when the router is employed, to route the output data to the third output port for provision to the second computation node, via the transport channel.

5. The first computation node of claim 1, wherein the execution unit comprises at least one calculation module selected from the group consisting of: an arithmetic logic unit, a floating point unit, a memory address unit, and a branch unit.

6. The first computation node of claim 1, wherein the first store is configured to store multiple instructions.

7. The first computation node of claim 1, further comprising a third store coupled to the at least one input port to store the input data.

8. A method, comprising:
loading an instruction of a subset of instructions of an assigned group of instructions into a buffer of a first of a preselected plurality of interconnected computation nodes having been assigned to execute the group of instructions, wherein the loading is performed prior to availability of operands of the subset of instructions, wherein the buffer is part of a frame of buffers comprising stores disposed on the preselected subset of interconnected computation nodes for loading the subset of instructions for execution, wherein the group of instructions is selected from a plurality of groups of instructions partitioned from a program;
directly receiving by the first preselected computation node, an associated operand of the instruction, from a second of the preselected computation nodes, via a first direct channel directly coupling the first and second preselected computation nodes;
executing the instruction using the directly received associated operand, wherein the execution results in an output data; and
selectively, but directly, providing the output data to either the second computation node via a first output port of the first computation node, or a third of the preselected computation nodes via a second output port of the first computation node, for execution of another one of the subset of instructions, wherein the first and second output ports are configured to be respectively coupled to a second direct channel and a third direct channel, directly and respectively coupling the first computational node to the second and third computational nodes, wherein the first computational node further comprises a router configured to be able to route the output data to either a third output port or a fourth output port, for alternative selective provision to either the second computation node or the third computation node, via a transport channel, and wherein the plurality of computation nodes are further interconnected via the transport channel.

9. The method of claim 8, wherein at least one of the plurality of groups of instructions is a basic block.

10. The method of claim 8, wherein at least one of the plurality of groups of instructions is a hyperblock.

11. The method of claim 8, wherein at least one of the plurality of groups of instructions is a superblock.

12. The method of claim 8, wherein at least one of the plurality of groups of instructions is an instruction trace constructed by a hardware trace construction unit at run time.

13. Non-transitory computer-storage medium comprising:
machine executable instructions stored therein, in response to execution by a first computation node, enables the first computation node to practice a method comprising:
loading an instruction of a subset of instructions of an assigned group of instructions into a buffer of the first computation node, wherein the group of instructions is selected from a plurality of groups of instructions partitioned from a program, wherein the buffer is part of a frame of buffers comprising stores disposed on a subset of interconnected preselected computation nodes for storing the subset of instructions, wherein the subset of instructions is loaded into the frame of buffers prior to associated operands of the subset of instructions are available, wherein the subset of interconnected preselected computation nodes is assigned to execute the group of instructions and includes the first and at least a second computation node;
directly receiving an associated operand of the instruction, from the second of the preselected computation nodes, via a first direct channel directly coupling the first and the second computation nodes;
executing the instruction using the directly received associated operand, wherein the execution results in an output data; and
selectively, but directly, providing the output data to either the second computation node via a first output port, or a third of the preselected computation nodes via a second output port, for execution of another one of the subset of instructions, wherein the first and second output ports are configured to be respectively coupled to a second direct channel and a third direct channel, directly and respectively coupling the first computational node to the second and third computational nodes, wherein the first computational node further comprises a router configured to be able to route the output data to either a third output port or a fourth output port, for alternative selective provision to either the second computation node or the third computation node, via a transport channel, and wherein the plurality of computation nodes are further interconnected via the transport channel.

14. The computer storage medium of claim 13, wherein at least one of the plurality of groups of instructions is a basic block.

15. The computer storage medium of claim 13, wherein at least one of the plurality of groups of instructions is a hyperblock.

16. The computer storage medium of claim 13, wherein at least one of the plurality of groups of instructions is a superblock.

17. The computer storage medium of claim 13, wherein at least one of the plurality of groups of instructions is an instruction trace constructed by a hardware trace construction unit at run time.

18. A first computation node, comprising:
means for coupling the first computation node to a second computation node of a plurality of computation nodes, via a first direct channel, for directly receiving input data from the second computation node, wherein the plurality of computation nodes are preselected to execute a subset of a group of instructions that is partitioned from a program, and the plurality of computation nodes include at least the first and second computation nodes;
means for receiving an instruction from an external instruction sequencer, and storing the instruction, wherein the means for storing the instruction, together with similar means of at least a third of the preselected computation nodes form a frame of buffers spanning the plurality of preselected computation nodes to store the subset of instructions prior to availability of operands of the subset of instructions;

means for executing the instruction using the input data to produce output data;

means for selectively, but directly, providing the output data from the first computation node to either the second computation node via a first output port, or the third computation node via a second output port, for execution of another one of the subset of instructions, wherein the first and second output ports are configured to be respectively coupled to a second direct channel and a third direct channel, directly and respectively coupling the first computational node to the second and third computational nodes;

means for routing the output data to either a third output port or a fourth output port, for alternative selective provision to either the second computation node or the third computation node, via a transport channel, wherein the plurality of computation nodes are further interconnected via the transport channel.

* * * * *

UNITED STATES PATENT AND TRADEMARK OFFICE
CERTIFICATE OF CORRECTION

| | | |
|---|---|---|
| PATENT NO. | : 8,055,881 B2 | Page 1 of 1 |
| APPLICATION NO. | : 12/136645 | |
| DATED | : November 8, 2011 | |
| INVENTOR(S) | : Burger et al. | |

It is certified that error appears in the above-identified patent and that said Letters Patent is hereby corrected as shown below:

Title page, item (75), under "Inventors", in Column 1, Line 3, delete "Karthikevan" and insert -- Karthikeyan --.

Title page, item (57), under "Abstract", in Column 2, Line 3, delete "other 5 computation" and insert -- other computation --.

Title Page 2, item (56), under "Other Publications", in Column 1, Line 4, delete "Transaction" and insert -- Transactions --.

Column 1, lines 7-8, delete "application of co-pending U.S." and insert -- application of U.S. --.

Column 1, line 16, delete "119 (e)" and insert -- 119(e) --.

Signed and Sealed this
Twenty-sixth Day of June, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,055,881 B2 | Page 1 of 1 |
| APPLICATION NO. | : 12/136645 | |
| DATED | : November 8, 2011 | |
| INVENTOR(S) | : Burger et al. | |

It is certified that error appears in the above-identified patent and that said Letters Patent is hereby corrected as shown below:

In the Specification

<u>Column 1</u>

Lines 18-19, under "Cross-Reference to Related Applications", insert -- This Invention was made with government support under Grant no. CCR9985109 awarded by the National Science Foundation. The government has certain rights in the invention. --

Signed and Sealed this
Twenty-sixth Day of May, 2015

Michelle K. Lee
*Director of the United States Patent and Trademark Office*